United States Patent
Morimoto et al.

(10) Patent No.: US 7,698,574 B2
(45) Date of Patent: Apr. 13, 2010

(54) POWER SUPPLY DEVICE AND COMMUNICATION SYSTEM

(75) Inventors: Kenichi Morimoto, Kyoto (JP); Yoshio Nishimoto, Kyoto (JP); Kazuya Iwabayashi, Tenri (JP); Yoshifumi Maitani, Nara (JP); Yusuke Nagano, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 431 days.

(21) Appl. No.: 10/567,285

(22) PCT Filed: Aug. 4, 2003
(Under 37 CFR 1.47)

(86) PCT No.: PCT/JP03/09854

§ 371 (c)(1),
(2), (4) Date: May 19, 2008

(87) PCT Pub. No.: WO2005/011990

PCT Pub. Date: Feb. 10, 2005

(65) Prior Publication Data

US 2009/0119525 A1    May 7, 2009

(51) Int. Cl.
*G06F 1/32* (2006.01)
(52) U.S. Cl. .................. 713/300; 713/310; 713/320; 713/321; 713/322; 713/323; 713/324; 713/330; 713/340
(58) Field of Classification Search .................. 713/300, 713/310, 320–324, 330, 340
See application file for complete search history.

(56) References Cited

U.S. PATENT DOCUMENTS 5,886,425 A * 3/1999 Shin .............................. 307/66

FOREIGN PATENT DOCUMENTS

| JP | 08-166862 | 6/1996 |
|---|---|---|
| JP | 10-175355 | 6/1998 |
| JP | 2000-196789 | 7/2000 |
| JP | 2002-086768 | 3/2002 |
| JP | 2002-347310 | 12/2002 |

(Continued)

OTHER PUBLICATIONS

International Search Report for corresponding Application No. PCT/JP2003/009854 mailed Sep. 9, 2003.

*Primary Examiner*—Abdelmoniem Elamin
(74) *Attorney, Agent, or Firm*—Renner, Otto, Boisselle & Sklar, LLP

(57) ABSTRACT

The invention relates to a power supply device and a communication system. The power supply device supplies power to a main device. The communication system is provided with the main device mounting the power supply device therein and an external device connected to the main device. A feature of the invention is to offer a power supply device and a communication system that are capable of being responsive to external signals for returning to a normal operation mode with minimum power consumption in a power-saving operation mode. In the power saving operation mode, a main power supply circuit (60) is turned off and only an auxiliary power supply circuit (50) is operated. In order to detect external signal, the auxiliary power supply circuit (50) supplies power not to an entire interface section (20), but to a ring detection circuit (31), a LAN signal detection circuit (32), a 1284 signal detection circuit (33), a USB signal detection circuit (34), and a panel signal detection circuit (35) that are respectively provided with a minimum functions for detecting external signal.

15 Claims, 15 Drawing Sheets

FOREIGN PATENT DOCUMENTS

| | | |
|---|---|---|
| JP | 2003-054091 | 2/2003 |
| JP | 2003-063101 | 3/2003 |
| JP | 2003-080800 | 3/2003 |
| JP | 2003-094770 | 4/2003 |
| JP | 2003-228444 | 8/2003 |

* cited by examiner

POWER SUPPLY DEVICE AND COMMUNICATION SYSTEM

FIELD OF THE INVENTION

The present invention relates to a power supply device that supplies power to an electrical appliance such as a personal computer and an image forming apparatus, and to a communication system provided with the power supply device.

BACKGROUND OF THE INVENTION

In electrical appliance such as personal computer and image forming apparatus, attention has been focused on reducing standby power consumption to a minimum level. One known solution is to incorporate a power supply device that stops power supply from a main power supply circuit during standby time.

However, an electrical appliance on standby is sometimes required to return to a normal operation mode in response to external signals. During standby time, a facsimile, for example, needs to be ready to appropriately receive facsimile data input externally over telephone lines. A printer needs to return to a normal operation state immediately on detection of image data input from a personal computer and perform an image forming operation according to the input image data.

Japanese Patent Application Laid-Open No. 2003-63101 discloses a composite machine including: a power saving controller for controlling power supply from a main power supply means to a main controller (main CPU) and detecting a trigger for cancellation of a power-saving operation mode; and an auxiliary power supply means for supplying power to the power saving controller. The composite machine stops power supply from the main power supply means in the power-saving operation mode, thereby reducing standby power consumption.

The composite machine of Japanese Patent Application Laid-Open No. 2003-63101, however, still consumes power more than necessary in the power-saving operation mode. The composite machine consumes power to be capable of communicating with external devices in the power-saving operation mode. In the composite machine, power is supplied to a sub CPU that performs power saving control and a bunch of interface sections, such as a FAX board and a PC interface board, that communicate with external devices.

Although the composite machine takes some malfunction prevention measures, the composite machine is likely to malfunction when a power-save request and a start-up request are input to the composite machine at about the same time with a slight time lug, or when noise are added to a power-save request to be input to the composite machine.

A feature of the present invention is to offer a power supply device and a communication system that are capable of receiving external signals with minimum power consumption in a power-saving operation mode.

Another feature of the present invention is to offer a power supply device and a communication system that are capable of preventing waste of power caused by false detection of input signal.

SUMMARY OF THE INVENTION (1) A power supply device, includes:

a main power supply circuit for supplying power to a main control section of a main apparatus, the main apparatus including an interface section for communicating with an external device, the interface section having a signal detection circuit for detecting an external signal;

an auxiliary power supply circuit for supplying power to the signal detection circuit; and a power control section configured to control the main power supply circuit and the auxiliary power supply circuit respectively, the power control section being configured to turn the main power supply circuit off and turn the auxiliary power supply circuit on when the main apparatus is in power saving mode, and to restart the main power supply circuit upon the detection of external signal by the signal detection circuit.

In the power saving mode where the main power supply circuit is stopped, the auxiliary power supply circuit supply power to only the signal detection circuit disposed in the interface section. The signal detection circuit has only limited function necessary to detect external signal input thereto.

Thus, this configuration allows the power supply device to be ready to detect external signal input thereto with minimum power consumption in the power saving operation mode.

The power control section turns on the main power supply circuit upon detection of external signal by the signal detection circuit, thereby allowing the power supply device in power saving operation mode to return to normal operation mode immediately after detection of external signal.

Examples of interface section include, but are not limited to user interface such as keyboard and pointing device to which user input command.

(2) The power supply device according to item (1), wherein the signal detection circuit is devoid of any clock generation circuit.

The signal detection circuit has no clock generating circuit, thereby preventing power from being consumed by the clock generating circuit.

Signal detection circuits such as IEEE 1284 signal detection circuit, ring detection circuit, and panel signal detection circuit operate properly without any clock generating circuit. In addition, Signal detection circuits such as LAN signal detection circuit and USB signal detection circuit detect external signal by detecting only device ID without any clock generating circuit.

(3) The power supply device according to item (1), wherein the interface section includes a interface having a power supply line, and wherein the signal detection circuit is supplied with power through the power supply line.

In this configuration, the signal detection circuit is supplied with power by the auxiliary circuit and power supply line of interface such as USB interface.

Thus in the power saving operation mode, power consumption at the auxiliary power supply circuit is reduced. And the signal detection circuit is operable even if power supplied from the auxiliary power supply circuit to the signal detection circuit is limited to small amount.

(4) The power supply device according to item (3), wherein the auxiliary power supply circuit is charged intermittently by the main power supply circuit or an interface having a power supply line.

In this configuration, the auxiliary power supply circuit is charged intermittently by the main power supply circuit or an interface having a power supply line.

Accordingly, even if the auxiliary power supply circuit consists of a secondary battery and the power saving operation mode continues for a long time, the auxiliary power supply circuit is capable of supplying enough power to the signal detection circuit.

(5) The power supply device according to item (3), wherein the auxiliary power supply circuit is charged by the main power supply circuit or an interface having a power supply line when the auxiliary power supply circuit outputs voltage lower than a predetermined value.

In the power saving operation mode, auxiliary power supply circuit is charged by the main power supply circuit or an interface having a power supply line to prevent the auxiliary power supply circuit from power shortage.

Thus, the auxiliary power supply circuit supplies power steadily to the signal detection circuit in the power saving operation mode.

(6) The power supply device according to item (1), wherein the power control section is configured to determine that external signal input to the signal detection circuit is valid only when the signal matches a predetermined pattern.

In this configuration, when external signal input to the signal detection circuit does not match a predetermined pattern, the power control section considers the signal as noise and determines that the signal is invalid.

Thus this configuration prevent the power supply device in the power saving mode from returning to normal operation mode upon detection of noise input to the signal detection circuit.

For example, false detection of external signal is averted by a procedure for making sure that signal input to the signal detection circuit is corresponding to device ID of devices connected to the main apparatus through IEEE1284 interface and a LAN card respectively.

(7) The power supply device according to item (1), wherein the power control section is configured to determine that external signal input to the signal detection circuit is valid only when the signal continues for a predetermined period.

When external signal input to the signal detection circuit does not continue for a predetermined period, the power control section considers the signal as noise and determines that the signal is invalid.

Thus this configuration prevent the power supply device in the power saving mode from returning to normal operation mode upon detection of noise input to the signal detection circuit.

(8) The power supply device according to item (1), wherein the power control section is configured to determine that power saving request for switching the power supply device to the power saving mode is valid only when the power saving request matches a predetermined pattern.

When power saving request signal input to the power control section does not match a predetermined pattern, the power control section considers the signal as noise and determines that the signal is invalid.

Thus this configuration prevents the power supply device which should be kept in the normal operation mode from shifting to the power saving operation mode upon detection of noise input to the signal detection circuit.

(9) The power supply device according to item (1), wherein the power control section is configured to determine that power saving request for switching the power supply device to the power saving mode is valid only when the power saving request continues for a predetermined period.

When power saving request signal input to the power control section does not continue for a predetermined period, the power control section considers the signal as noise and determines that the signal is invalid.

Thus this configuration prevents the main power supply circuit in operation from being turned off upon detection of noise input to the signal detection circuit.

(10) The power supply device according to item (1), wherein the power control section is configured to render the main power supply circuit off, even if an external signal input to the signal detection circuit is detected, until the main power supply circuit stops completely after receiving power saving request which indicates that the main apparatus is shifting to the power saving operation mode.

In this configuration, the control section becomes unresponsive to external signal input to the signal detection circuit after the power supply device start shifting to the power saving operation mode.

In other words, this configuration prevent the main power supply circuit from operating in the situation where the main power supply circuit is not ready to supply enough voltage.

Thus, the main power supply circuit is not turned on when power monitor IC can not generate reset pulse, and the power supply device and the main apparatus become unlikely to malfunction.

(11) The power supply device according to item (10), wherein the power control section is configured to determine that the power saving request is valid only when the power saving request continues for a predetermined period.

When power saving request signal input to the power control section does not continue for a predetermined period, the power control section considers the signal as noise and determines that the signal is invalid.

Thus this configuration prevents the main power supply circuit in operation from being turned off upon detection of noise input to the signal detection circuit.

(12). The power supply device according to item (11), wherein the power control section is configured to determine that external signal input to the signal detection circuit is valid when the signal is input thereto within a predetermined period after the input of the power saving request and to render the main power supply circuit on-state.

The power control section determines that external signal input to the signal detection circuit is valid when the signal is input thereto during a predetermined period between receipt of power saving request signal by the power control section and completion of the control section's verification process regarding to the power saving request.

Thus it is unlikely that the main power supply circuit is unnecessarily turned off and that stoppage of the main power supply circuit's operation cause the main apparatus to be unresponsive to external signal input to the signal detection circuit.

(13) The power supply device according to item (12), wherein the power control section is configured to reject subsequent power saving requests until ongoing power saving request is withdrawn.

In this configuration, the power control section rejects subsequent power saving requests until ongoing power saving request signal is withdrawn. The ongoing power saving request signal is suspended since another signal is input to the signal detection circuit at about the same time as the power saving request signal.

Thus it is unlikely that the ongoing power saving request cause the main power supply circuit to turn off unnecessarily.

(14) A communication system, includes:

a power supply device, having a main power supply circuit for supplying power to the main control section of a main apparatus, the main apparatus including an interface section for communicating with an external device, the interface section having a signal detection circuit for detecting an external signal, an auxiliary power supply circuit for supplying power to the signal detection circuit, and a power control section configured to control the main power supply circuit and the auxiliary power supply circuit respectively, the power control section being configured to turn the main power supply circuit off and turn the auxiliary power supply circuit on when the main apparatus is in power saving mode, and to restart the main power supply circuit upon the detection of external signal by the signal detection circuit; and an external device connected to the main apparatus through the interface section, wherein the external device transmits a piece of data repeatedly to the main apparatus.

Thus, it is not necessary for the main apparatus to analyze first coming signal input thereto and to keep a circuit that analyze external signal operating in the power save operation mode.

Therefore in the power saving operation mode, power consumption at the communication system is reduced.

(15) The communication system according to item (14), wherein the external device recognizes lack of response as a communication error only after a predetermined number of times of sending the same piece of data.

The external device does not recognize lack of the response as a commutation error before the external device sends the same piece of data for a predetermined times in the light of amount of time required for the power supply device's start-up.

Thus it is unlikely that a communication error is notified though the external device and the main apparatus are both ready to communicate with each other.

DETAILED DESCRIPTION OF THE INVENTION

Figure 1:
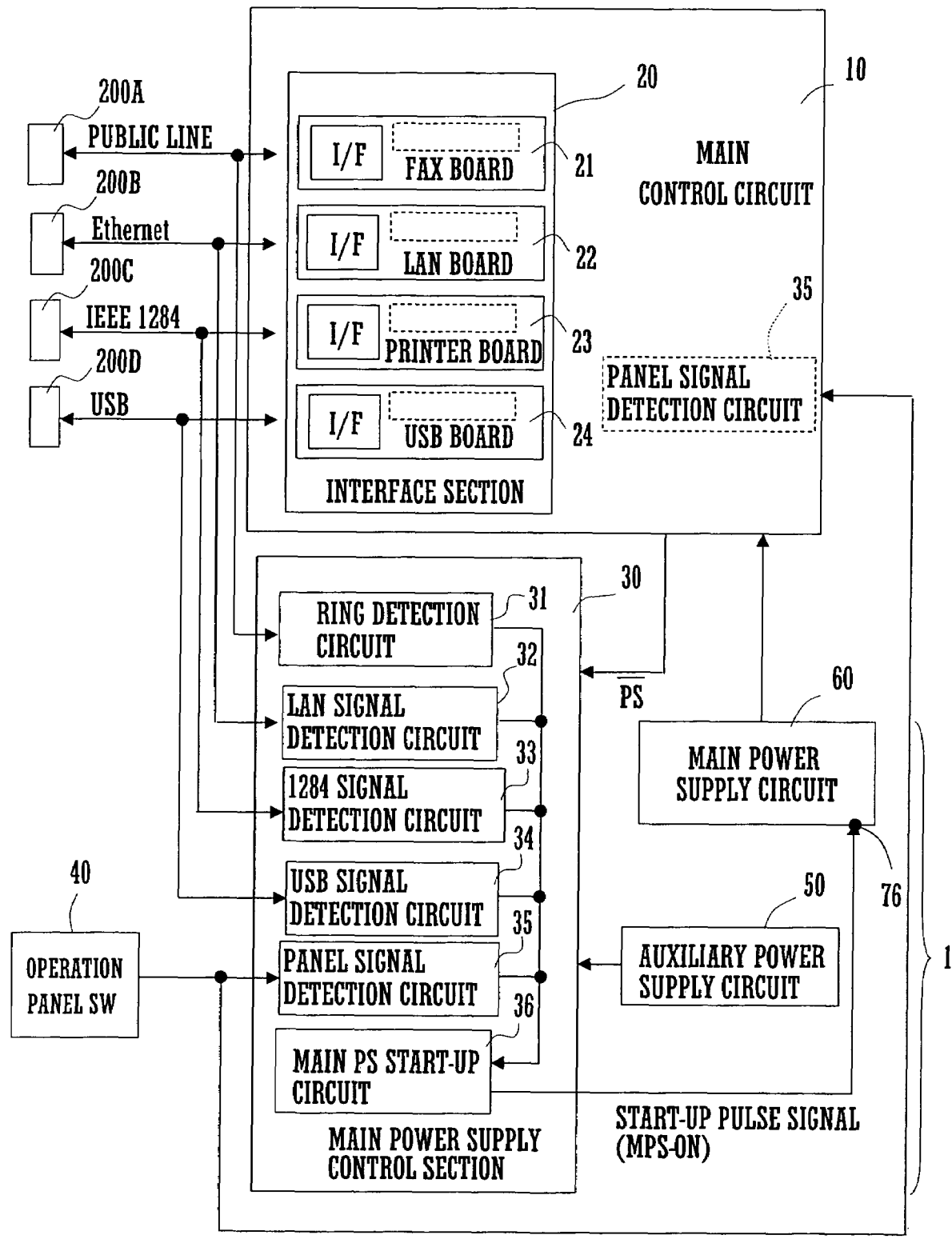
FIG. 1 is a schematic block diagram of a power supply device and communication system according to a first embodiment of the present invention.

Referring to the drawings, described below is a first embodiment in which a power supply device and a communication system of the invention are applied to a multi-function printer (hereinafter merely as MFP) that has functions of facsimile, scanner, printer, and copy. In the first embodiment, the MFP corresponds to a main apparatus incorporating a power supply device of the invention. The MFP should not be considered a limitation as to a main apparatus to which the invention applies. The invention is also applied to electrical appliances other than the MFP such as a personal computer FIG. 1 is a block diagram illustrating a configuration of a power supply device 1 and a communication system according to the first embodiment of the present invention. As shown in FIG. 1, the communication system includes a power supply device 1, external devices 200A to 200D, and MFP. The MFP has a main control circuit 10, the power supply device 1, and an operation panel switch 40. The power supply device 1 has a main power supply control section 30, an auxiliary power supply circuit 50, a main power supply circuit 60.

The main control circuit 10 is a main controller of MFP. The main control circuit 10 includes an interface section 20 that is utilized for communication between the MFP and external devices 200A to 200D connected to the MFP. The main control circuit 10 outputs a $\overline{PS}$ signal with low level value to the main power supply control section 30, when stopping operation of the main power supply circuit 60.

The interface section 20 has a FAX board 21, a LAN board 22, a printer board 23 and a USB board 24. The FAX board 21 is used for communication of FAX data input and output through a public line. The LAN board 22 is used for data communication over Ethernet and the like within a local area network ("Ethernet" is a trademark). The printer board 23 is used for communication with an external personal computer through an IEEE 1284 interface. The USB board 24 is used for communication with a USB device, such as a digital camera or an image storage device, through a USB interface.

The main power supply control section 30 has a ring detection circuit 31, a LAN signal detection circuit 32, a 1284 signal detection circuit 33, a USB signal detection circuit 34, a panel signal detection circuit 35, and a main power supply start-up circuit 36. The ring detection circuit 31 detects FAX data received through the public line. The LAN signal detection circuit 32 detects input of communication data over Ethernet within the local area network ("Ethernet" is a trademark). The 1284 signal detection circuit 33 detects a signal input from the external device 200C through the IEEE 1284 interface. The USB signal detection circuit 24 detects a signal input from the external device 200D through the USB interface. The panel signal detection circuit 35 detects whether a button on the operation panel switch 40 is pressed by a user. The main power supply start-up circuit 36 starts up the main power supply circuit 60 in accordance with the signals input from the circuits 31 to 35.

The operation panel switch 40 is used for a user to input commands to the MEP. In this embodiment, the operation panel switch 40 is used for a user to input command for returning the MFP in the power-saving mode to the normal operation mode.

The auxiliary power supply circuit 50 is adapted to supply power, in the power-saving operation mode, to the ring detection circuit 31, the LAN signal detection circuit 32, the 1284 signal detection circuit 33, the USB signal detection circuit 34, the panel signal detection circuit 35, and the main power supply start-up circuit 36. In the embodiment, the ring detection circuit 31, the LAN signal detection circuit 32, the 1284 signal detection circuit 33, the USB signal detection circuit 34, and the panel signal detection circuit 35 correspond to signal detection circuits of the invention respectively. The main power supply control section 30 corresponds to a power control section of the invention.

The main power supply circuit 60 supplies a predetermined amount of power to components of the MFP such as the main control circuit 10. With no command received for more than a predetermined period of time, the main control circuit 10 switches from normal operation mode to the power-saving operation mode in order to reduce standby power consumption. In the power-saving operation mode, the main power supply circuit 60 supplies no power to each component of the MFP until the next command and the like are input.

Upon detection of an input start-up signal such as an input command, the power supply device 1 returns to the normal operation mode, and the main power supply circuit 60 restarts supplying power to each component of the MFP such as the main control circuit 10.

Figure 2:
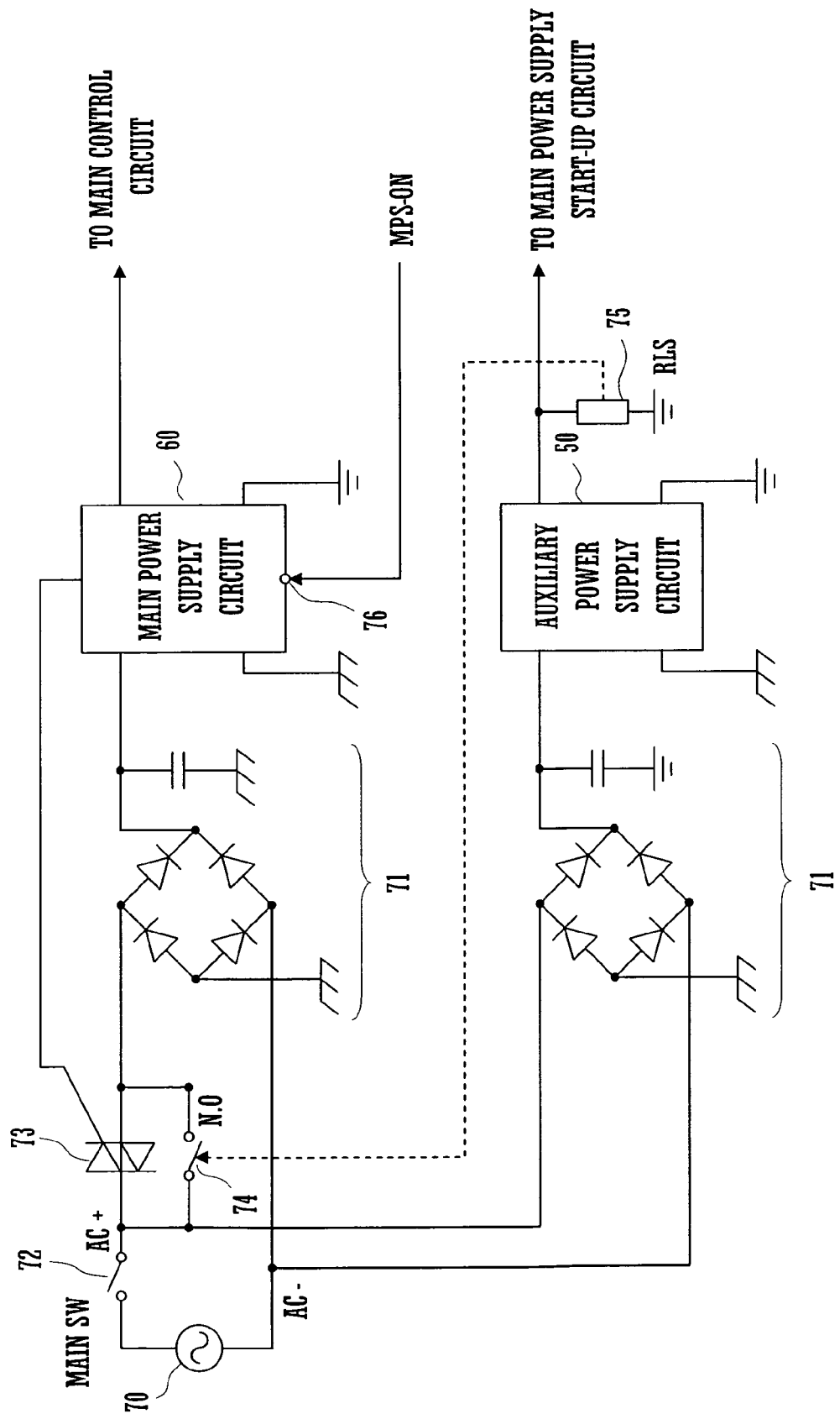
FIG. 2 is a diagram illustrating a configuration of a power supply device according to the first embodiment of the present invention.

FIG. 2 is a diagram illustrating a configuration of principal parts of the power supply device 1. As shown in FIG. 2, a predetermined amount of power is supplied to the power supply device 1 from a commercial power supply 70. The main power supply circuit 60 and the auxiliary power supply circuit are connected in parallel to the commercial power supply 70. There are provided a smoothing circuits 71 for rectification and smoothing respectively between the commercial power supply 70 and the main power supply circuit 60, and between the commercial power supply 70 and the auxiliary power supply circuit 50. There are also provided a main switch 72, a triac 73, and a normally open relay contact 74 intermediate between the commercial power supply 70 and the main power supply circuit 60. The main power supply circuit 60 is provided with an MPS signal input terminal 76 that receives a low-level signal (MPS-ON signal) to switch on the main power supply circuit 60, and a high-level signal (MPS-OFF signal) to switch off the main power supply circuit 60. Further, There is provided a relay coil 75 for switching on/off the relay contact 74, the relay coil 75 being connected to the auxiliary power supply circuit 50.

In the configuration illustrated in FIG. 2, turning on the main switch 72 activates the MFP. The triac 73 is not conductive and the relay contact 74 is not closed when the MFP is started. Accordingly, current flows from the commercial power supply 70 to the auxiliary power supply circuit 50. Then the auxiliary power supply circuit 50 starts and supplies power to the relay coil 75. Current flowing through the relay coil 75 causes the relay contact 74 to be closed, thereby allowing current flow from the commercial power supply 70 to the main power supply circuit 60. Subsequently, the main power supply circuit 60 starts to supply power to a gate of the triac 73, thereby allowing the triac 73 to become conductive. Then the power supply device 1 becomes normal operation mode.

Figure 3:
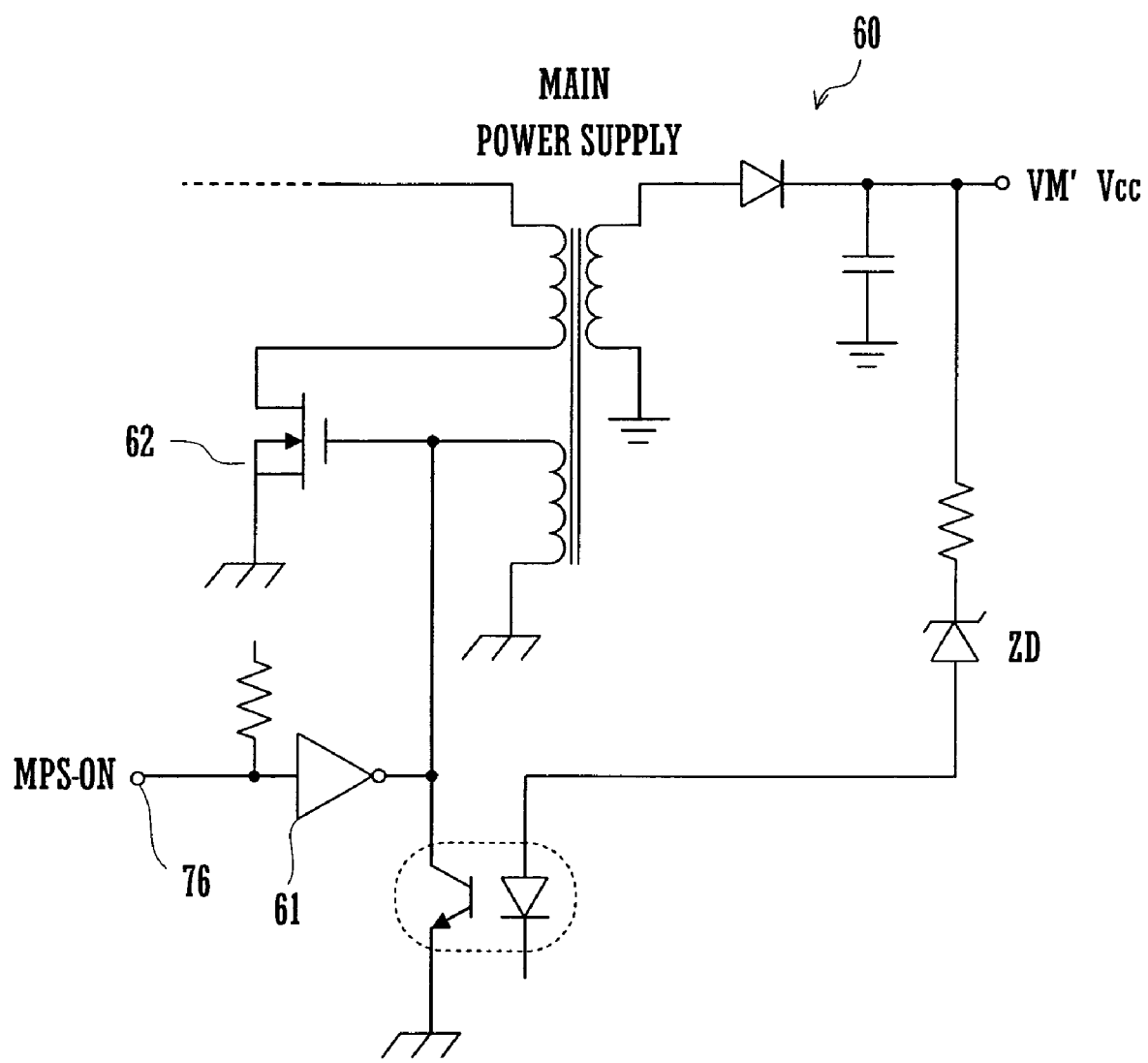
FIG. 3 is a diagram illustrating a configuration of a main power supply circuit.

FIG. 3 illustrates a configuration of principal parts of the main power supply circuit 60. To the MPS signal input terminal 76, an MPS-ON signal or an MPS-OFF signal that are generated by the main power supply control section 30. When an MPS-ON signal (low level) is input to the MPS signal input terminal 76, output of the inverter (open-collector) 61 is put in a high-impedance state, thereby causing a gate of the switching transistor 62 to become ungrounded. A valid feedback signal is thus input to the gate of the switching transistor 62 from the first primary winding, thereby causing switching oscillation. When an MPS-OFF (high level) signal is input to the MPS signal input terminal 76, in contrast, the gate of the switching transistor 62 is forced to be grounded. Switching oscillation of the switching transformer is thus stopped.

For example, when an MPS-OFF signal is input to the MPS signal input terminal 76 in the normal operation mode, switching oscillation of the switching transformer is stopped. Thus the main control circuit 10 switches from normal operation mode to the power-saving operation mode. With no command input to the MFP for more than a predetermined time, the main control circuit 10 outputs a $\overline{PS}$ signal to the main power supply control section 30. Upon receipt of the valid $\overline{PS}$ signal, the main power supply start-up circuit 36 outputs an MPS-OFF signal to the MPS signal input terminal 76.

On the contrary, when an MPS-ON signal is input to the MPS signal input terminal 76 in the power-saving operation mode, switching oscillation of the switching transformer is started, and the main control circuit 10 switches from the power-saving operation mode to normal operation mode.

Figure 4A:
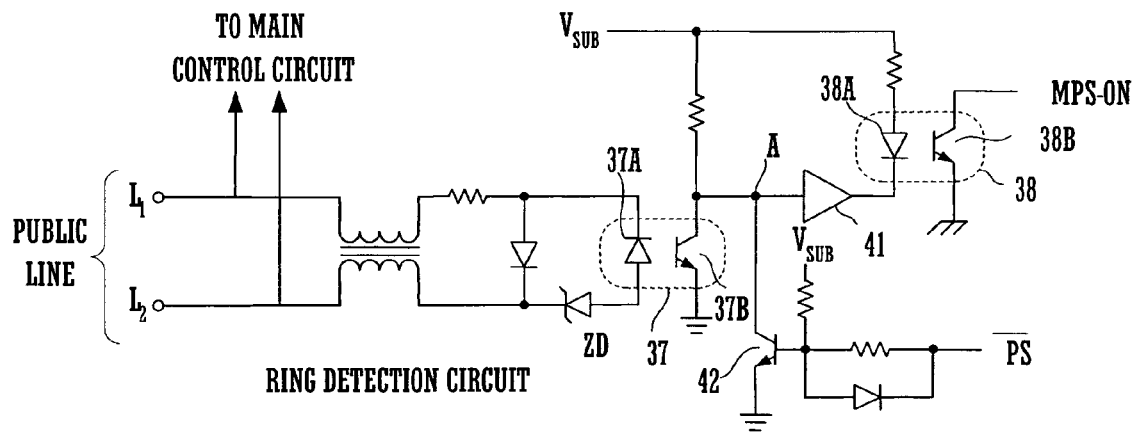
FIGS. 4(A) and 4(B) are diagrams illustrating a configuration of principal parts of a main power supply control section, respectively.
Figure 4B:
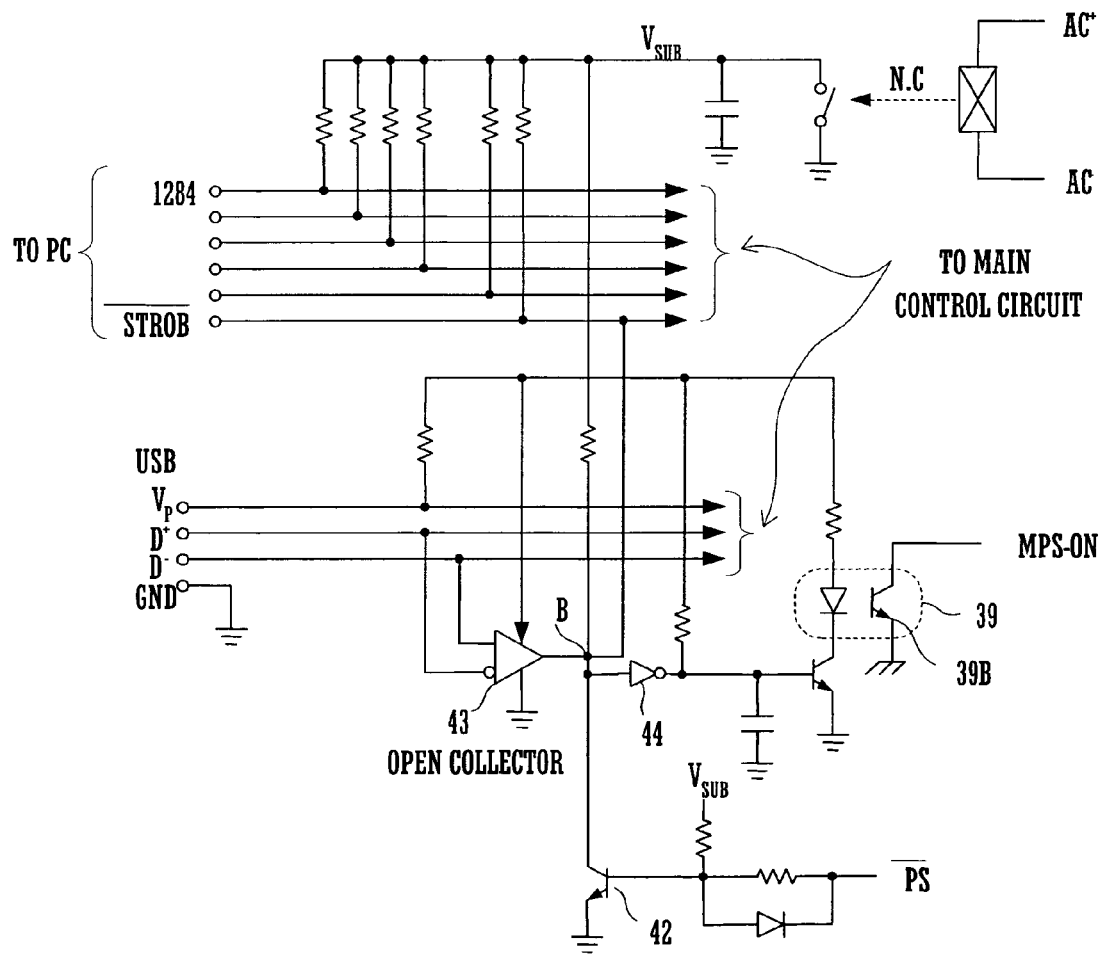

FIGS. 4(A) and 4(B) illustrate a configuration of principal parts of the signal detection circuits and the main power supply start-up circuit 36 according to the present invention. FIG. 4(A) illustrates circuit that detects a FAX signal input through a public line as a start-up signal and turns the main power supply circuit 60 on. FIG. 4(B) illustrates circuits that detects, as a start-up signal, a-signal input from the external devices 200C to 200D through the IEEE 1284 interface or the USB interface and turns the main power supply circuit 60. FIG. 4(B) illustrates an example of configuration in which power supplied from a power supply line of the USB interface is utilized to switch the MFP 1 from the power-saving operation mode back to the normal operation mode.

Input of an MPS-ON signal to the MPS signal input terminal 76 is required for turning the main power supply circuit 60 on. With a phototransistor 38B of a photocoupler 38 in nonconductive state, a high-level signal is input to the inverter 61 through a pull-up resistor, as shown in FIG. 3, located on an input side of the inverter 61.

At this time, with the MFP in the normal operation mode, a transistor 42 is in conductive state since potential $V_{SUB}$ of the auxiliary power supply circuit 50 is input to a base of the transistor 42. When the transistor 42 is in conductive state, a connection point A in FIG. 4(A) has a low-level potential. Current is thus allowed to pass through a light-emitting diode 38A, so that the phototransistor 38B becomes conductive. Accordingly, an MPS-ON signal is input to the MPS signal input terminal 76, thereby turning the main power supply circuit 60 on.

With the MFP in the power-saving operation mode, in contrast, input of a low-level $\overline{PS}$ signal renders the transistor 42 nonconductive, thereby causing the connection point A to have a high-level potential. The photo-transistor 38B thus becomes nonconductive and an MPS-ON signal is prevented from being input to the MPS signal input terminal 76. The output of the inverter 61 becomes low-level and the gate of the switching transistor 62 is forced to be grounded, so that the main power supply circuit 60 is turned off.

When detecting a predetermined FAX signal input through a public line in the power-saving operation mode, as shown in FIG. 4(A), the light-emitting diode 37A of the photocoupler 37 causes the phototransistor 37B to be conductive. The connection point A thus has a low-level potential, so that the phototransistor 38B of the photocoupler 38 becomes conductive. Since as a result an MPS-ON signal is input to the MPS signal input terminal 76, the main power supply circuit 60 is turned on again and the MFP is switched from the power-saving operation mode back to the normal operation mode.

FIG. 4(B) illustrates an example of configuration in which an IEEE 1284 signal or a USB signal is detected as a start-up signal, instead of the FAX signal in FIG. 4(A). The MFP is switched from the power-saving operation mode back to the normal operation mode in a similar manner in the configuration as shown in FIG. 4(A).

A feature of the configuration as shown in FIG. 4(B) is that power supplied from a power supply line $V_P$ of the USB interface is used to turn on the main power supply circuit 60 upon detection of the start-up signal.

A $\overline{\text{STROB}}$ signal and output of a line buffer (open-collector) 43 are in wired-OR connection at a connection point B, to be connected to an inverter (open-collector) 44. The phototransistor 39B and the phototransistor 38B are in wired-OR connection. Thus, when the photo-transistor 39B becomes conductive, an MPS-ON signal is input to the MPS signal input terminal 76 as in the above-described case where the transistor 38B becomes conductive. The main power supply circuit 60 is thus turned on again. Although not shown in the figure, there may be an alternative configuration where power is supplied from a power supply line of another interface instead of the power supply line $V_P$ of the USB interface.

Figure 5A:
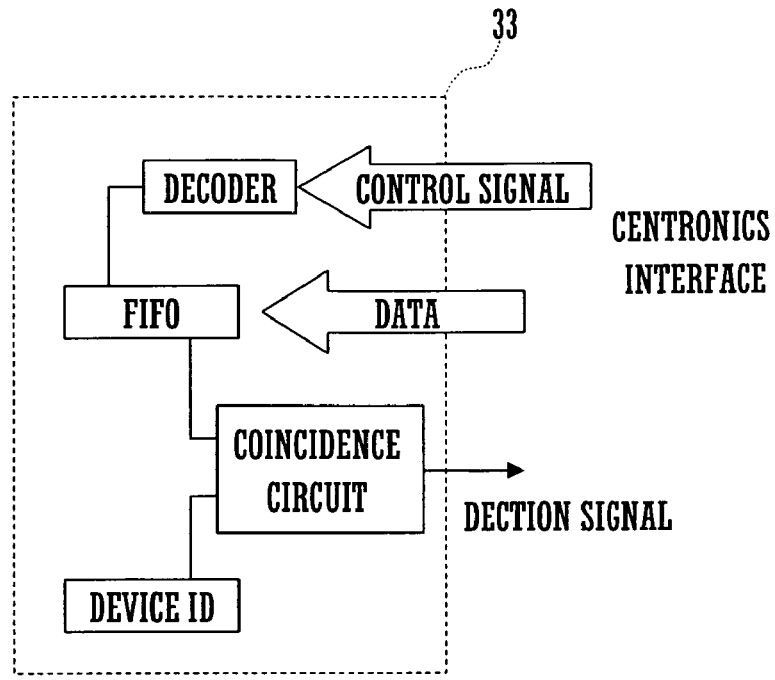
FIG. 5(A) and FIG. 5(B) are block diagrams illustrating how a device ID and an ID of a input command are recognized, respectively.
Figure 5B:
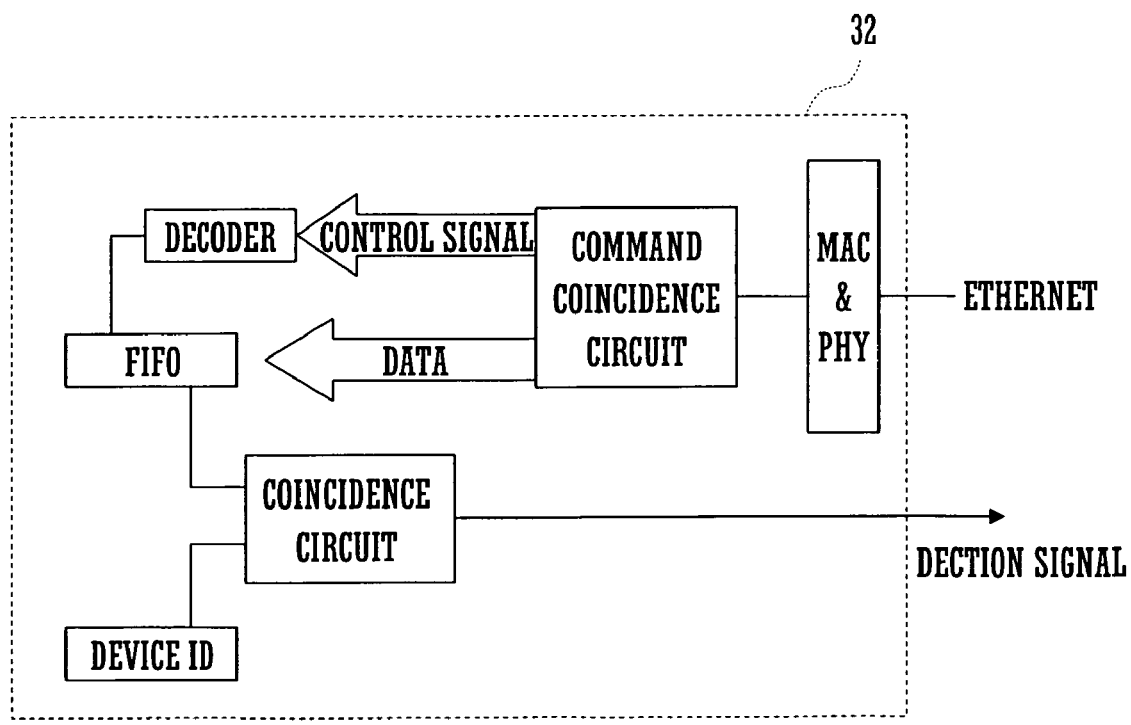

FIG. 5(A) and FIG. 5(B) are block diagrams illustrating how a device ID and an ID of a input command are recognized, respectively. As shown in FIGS. 5(A) and 5(B), the 1284 signal detection circuit 33 and the LAN signal detection circuit 32 have limited functions of determining whether device ID data included in input data corresponds to pre-registered device ID data and of outputting, if the device ID data match, a start-up signal to turn on the main power supply circuit 60. The limited functions allow the 1284 signal detection circuit 33 and the LAN signal detection circuit 32 to have a simplified configuration.

Figure 6:
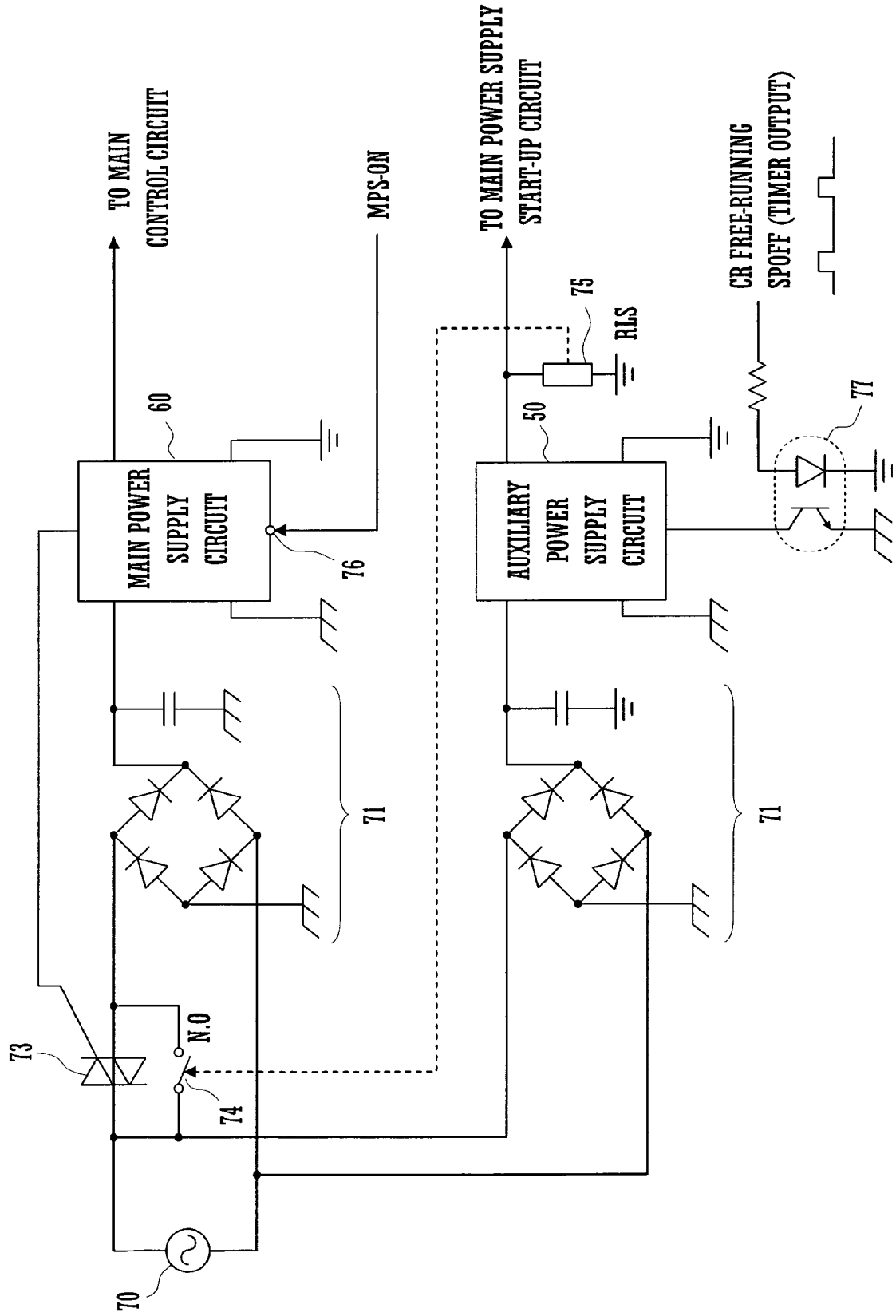
FIG. 6 is a diagram illustrating a variation of power supply circuit.

FIG. 6 illustrates a variation of power supply circuit. As shown in FIG. 6, the auxiliary power supply circuit 50 is turned on/off by input of a signal to a photocoupler 77. The auxiliary power supply circuit 50 is thus charged by the commercial power supply 70 at predetermined intervals during the power-saving operation mode.

Accordingly, even if kept in the power-saving operation mode for a long period of time, the auxiliary power supply circuit 50 can be prevented from failing to turn on the main power supply circuit 60 properly because of power shortage.

Figure 7:
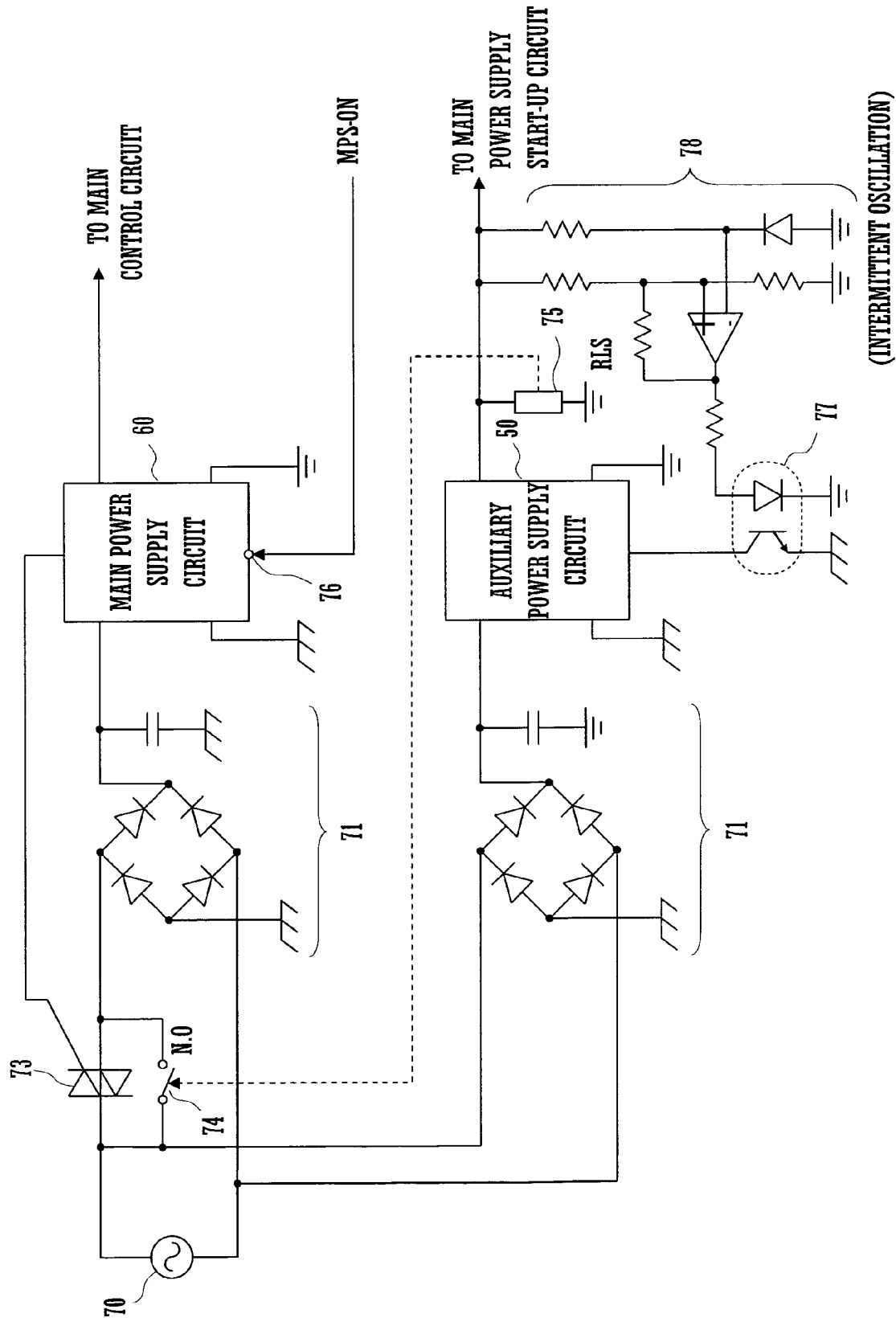
FIG. 7 is a diagram illustrating another variation of power supply circuit.

FIG. 7, as well as FIG. 6, illustrates a variation of power supply circuit. A power supply voltage monitor circuit 78 is provided for monitoring voltage output by the auxiliary power supply circuit 50. Upon detection of output of a lower voltage than a predetermined value by the auxiliary power supply circuit 50, the power supply voltage monitor circuit 78 outputs a signal to the photocoupler 77, so that the auxiliary power supply circuit 50 is charged.

Instead of the commercial power supply 70 in the variations as described above, an interface having a power supply line may be utilized to supply power to the auxiliary power supply circuit 50. In the variation as shown in FIG. 7 where power is supplied to the auxiliary power circuit 50 at intervals, the auxiliary power supply circuit 50 does not have a shortage of power, regardless of power capacity thereof, even when kept in the power-saving operation mode for a long time.

Figure 8:
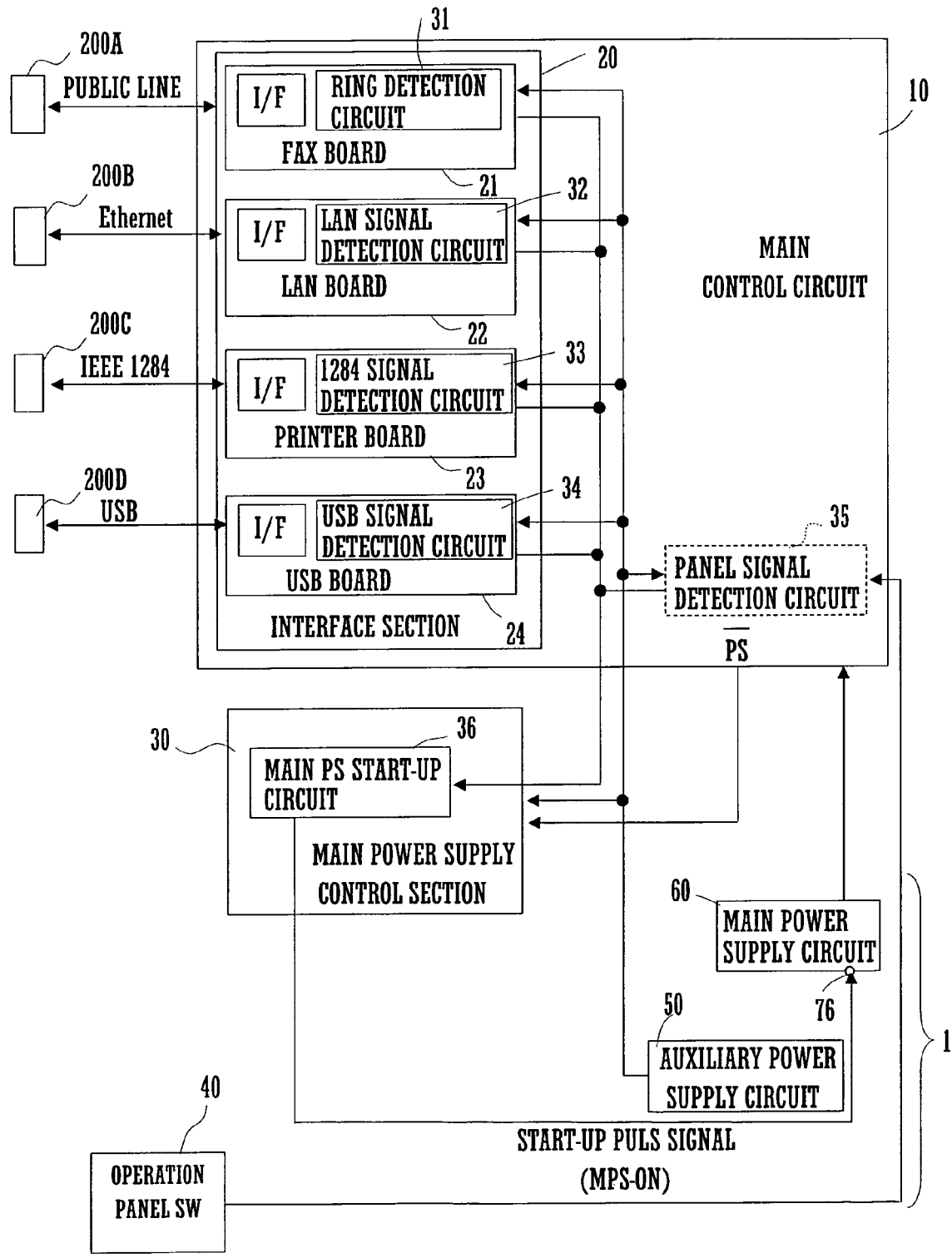
FIG. 8 is a schematic block diagram of a power supply device and communication system according to a second embodiment of the present invention.

FIG. 8 illustrates a configuration of a power supply device 1 according to a second embodiment of the present invention. This embodiment is different from the first embodiment in that a ring detection circuit 31, a LAN signal detection circuit 32, a 1284 signal detection circuit 33, and a USB signal detection circuit 34 are incorporated in a FAX board 21, a LAN board 22, a printer board 23, and a USB board 24, respectively. The circuits 31 to 34 are used for detecting start-up request signals only.

The auxiliary power supply circuit 50 supplies power only to the ring detection circuit 31, the LAN signal detection circuit 32, the 1284 signal detection circuit 33, and the USB signal detection circuit 34.

In the present embodiment, the ring detection circuit 31 is electrically disconnected to the other components of the FAX board 21. To the other components, the main power supply circuit 60 supplies power after being turned on.

In a data communication system including the MFP and external devices 200A to 200D, the external devices 200A to 200D transmit the same piece of data to the MFP multiple times. This is because of a feature of the MFP that in the power-saving operation mode the MFP recognizes a first input signal as a start-up signal for returning to the normal operation mode. More specifically, the MFP uses the first input signal to return to the normal operation mode, and recognizes the same signal input for the second and subsequent times as communication data. In view of time required for the MFP to return to the normal operation mode, the external devices 200A to 200D transmit a piece of data repeatedly to the MFP until the MFP returns a response confirming receipt of the piece of data.

Correspondingly, the external devices 200A to 200D recognize lack of the response as a communication error only after a predetermined number of times of sending the same piece of data. This allows smooth data communication in accordance with the foregoing feature of the MFP.

In addition, an interface to be used by the data communication system of the present invention is not limited to the wired interface as utilized in the foregoing embodiments, but is replaceable by a wireless interface such as Bluetooth.

Further, besides the signals input from the operation panel switch 40 or from the external devices 200A to 200D through the interfaces, a signal generated by insertion of a recording medium, such as a video disk or a memory stick, into the MFP may be recognized as a start-up signal.

Figure 9:
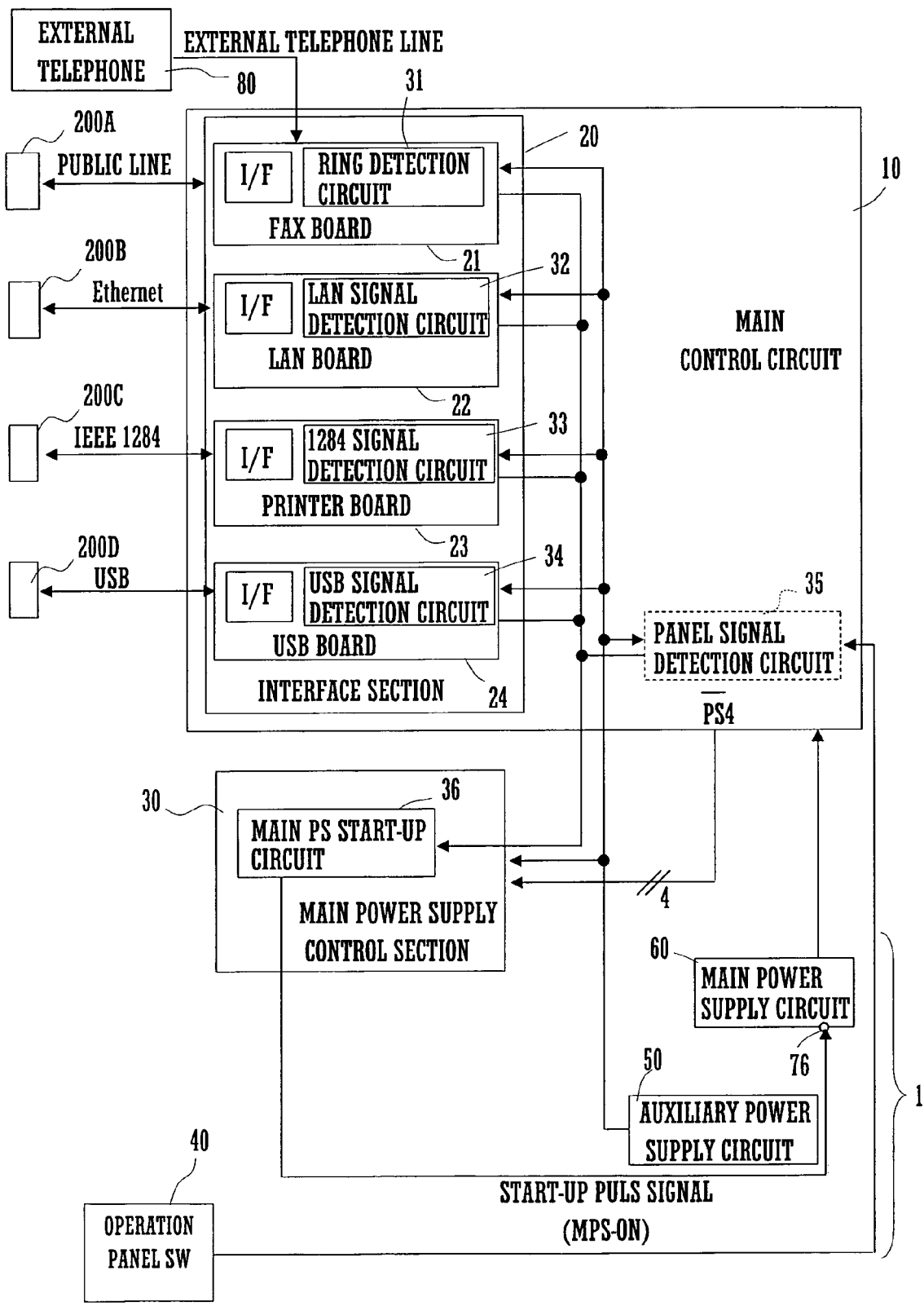
FIG. 9 is a block diagram illustrating a configuration of an image forming apparatus according to a third embodiment of the present invention.

FIG. 9 illustrates a configuration of a MFP according to a third embodiment of the present invention. The configuration is basically similar to that of the MFP according to the second embodiment.

As described in the first and second embodiments, POWER-SAVE Request ($\overline{\text{PS}}$) are generated by the main control circuit 10, and START-UP Request (start-up signal) are output by the interface section 20. If these Requests are input to the main power supply control section 30 at about the same time, the MFP sometimes malfunctions. For example, if the MFP switches to the power saving operation mode in situation where the MFP should be in normal operation mode, the MFP is forced to perform operations such as data communication without power supply from the main power supply circuit 60. A feature of the MFP according to the third embodiment is to prevent such malfunction.

In the third embodiment, the main control circuit 10 outputs a 4-bit power-save request $\overline{\text{PS4}}$ to the main power supply control section 30, instead of a power-save request $\overline{\text{PS}}$ in the first and second embodiments. If the request $\overline{\text{PS4}}$ matches a predetermined pattern of power-save request, the main power supply control section 30 generates a low-level $\overline{\text{PS}}$ signal for power-save request. If the request $\overline{PS4}$ does not match the predetermined pattern, in contrast, the main power supply control section 30 generates a high-level $\overline{PS}$ signal.

Figure 10:
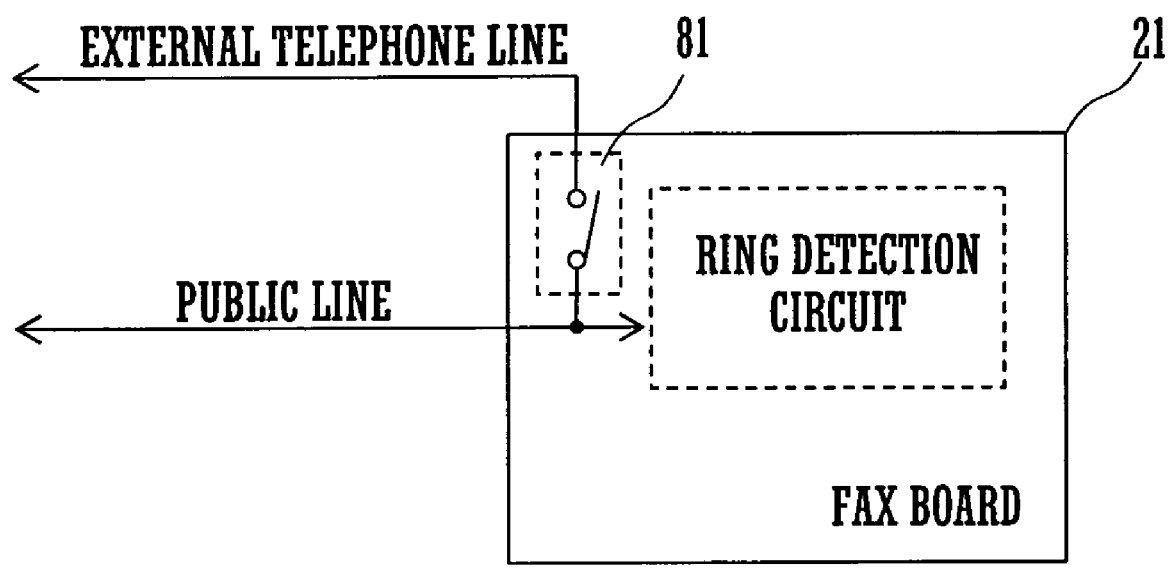
FIG. 10 is a block diagram illustrating a configuration of a FAX board in the third embodiment.

FIG. 10 illustrates a configuration of a FAX board 21 that has an external telephone additionally connected to a telephone line through a normally closed (or N.C.) relay contact 81. The MFP in the third embodiment decides that a power-save request or a start-up request is valid when the MFP confirms that the power-save request or the start-up request has been continued for a predetermined period of time. This is because decision based on detection of an edge of a power-save signal or a start-up request signal may result in false detection of such signal if the signal is overlapped with a noise.

Figure 11:
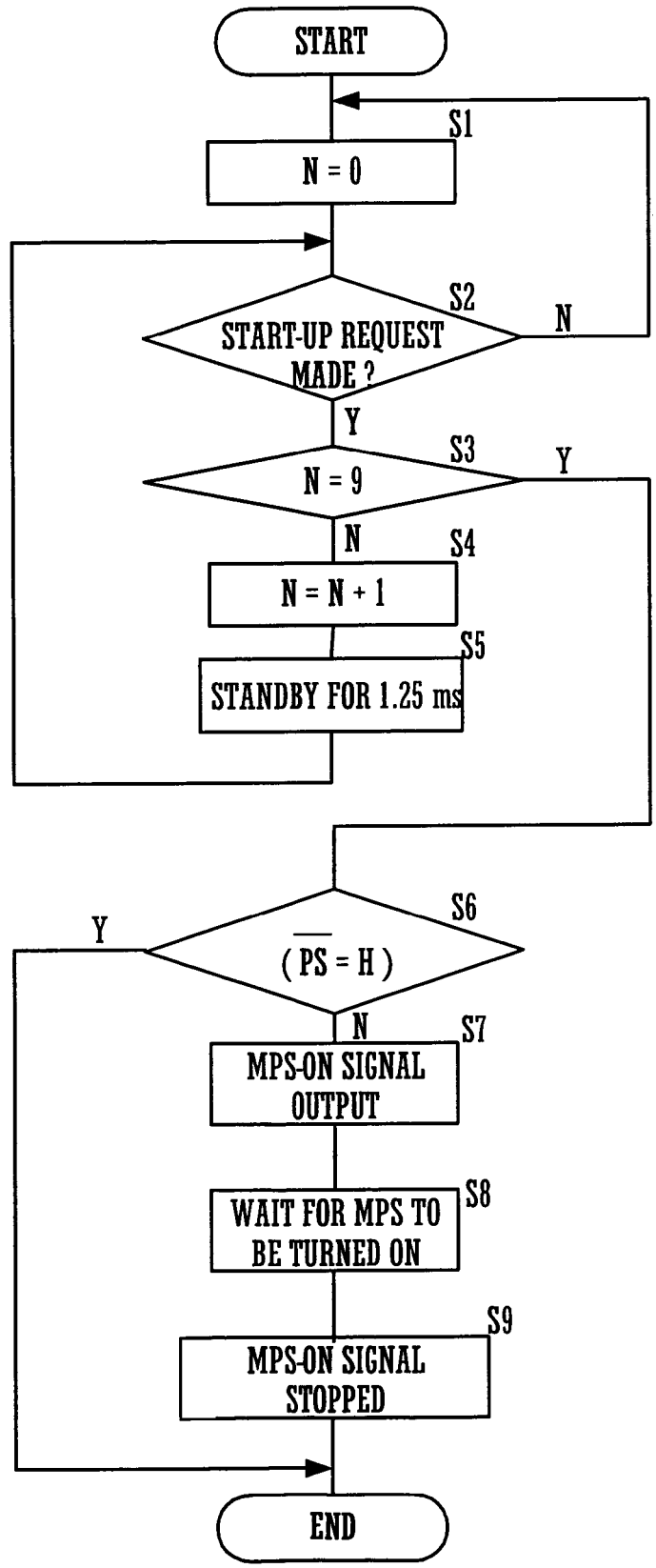
FIG. 11 is a flowchart of a process performed by the main power supply control section in returning to the normal operation mode.

FIG. 11 is a flowchart of a start-up process according to the third embodiment, performed by the main power supply control section 30. First, a count variable N for counting a period of time during which a start-up request is continued is cleared (step S1). The main power supply control section 30 is then held on standby until a start-up request is made (step S2).

When a start-up request is made at step S2, the main power supply control section 30 determines whether the count variable N has reached nine (step S3). In the present embodiment, counting is performed at intervals of 1.25 ms.

If the count variable N has not yet reached nine at step S3, the count variable N is incremented by one (step S4). After a standby period of 1.25 ms (step S5), the main power supply control section 30 determines again whether the start-up request is continued (step S2).

If the count variable N has already reached nine at step S3, the main power supply control section 30 determines whether the power supply device 1 is in the power-saving operation mode (step S6). At this time, if a power-save request has been withdrawn and the power supply device 1 is thus in the normal operation mode, the main power supply control section 30 stops the start-up process. If the main power supply circuit 60 is in stopped state at step S6, the main power supply control section 30 outputs a low-level start-up signal (MPS-ON signal) (step S7). Then, the main power supply control section 30 waits for the main power supply circuit 60 to be turned on (step S8), for a waiting period of 50 ms in the present embodiment. Confirming that the main power supply circuit 60 is turned on, the main control circuit 10 outputs a $\overline{PS4}$ signal that does not match the predetermined pattern of power-save request, so that a ongoing power-save request is withdrawn. Consequently, the main power supply control section 30 generates a high-level $\overline{PS}$ signal to bring the main power supply circuit 60 into operation. The main power supply control section 30 stop outputting a low-level start-up signal (step S9).

Figure 12:
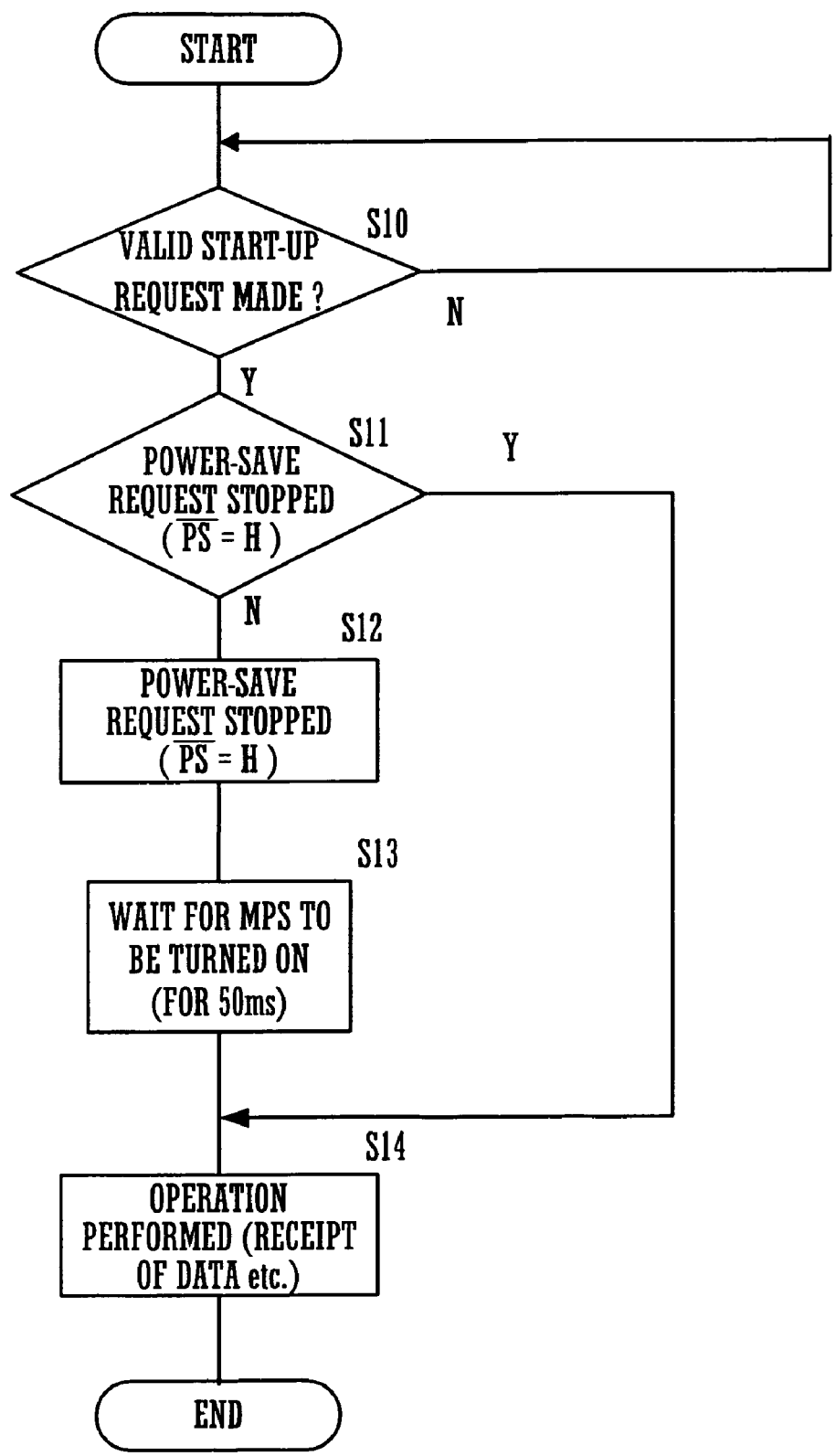
FIG. 12 is a flowchart of a process performed by the main control circuit in returning to the normal operation mode.

FIG. 12 is a flowchart of a process performed by the main power supply control section 30 in returning to the normal operation mode. The main control circuit 10 that is supplied with power by the main power supply circuit 60 is on standby until a valid start-up request is made (step S10).

When a valid start-up request is made at step S10, the main control circuit 10 determines whether a power-save request has been withdrawn (step S11). In the step S11, the main control circuit 10 determines whether a high-level $\overline{PS}$ signal is generated.

If a high-level $\overline{PS}$ signal is generated at step S11, the main power supply circuit 60 is already turned on and the main control circuit 10 thus performs an operation according to the start-up request (step S14). If a high-level $\overline{PS}$ signal is not generated at step S11, the main control circuit 10 outputs a high-level $\overline{PS}$ signal to the main power supply control section 30 to stop a power-save request (step S12). At the time, the main control circuit 10 makes the main power supply control section 30 output an MPS-ON signal to the main power supply circuit 60, by outputting a $\overline{PS4}$ signal that does not correspond to the predetermined pattern of power-save request. Then, the main control circuit 10 waits for a standby period of 50 ms for the main power supply control section 30 to be turned on (step S13). Then, the main control circuit 10 performs an operation according to the start-up request (step S14).

Figure 13:
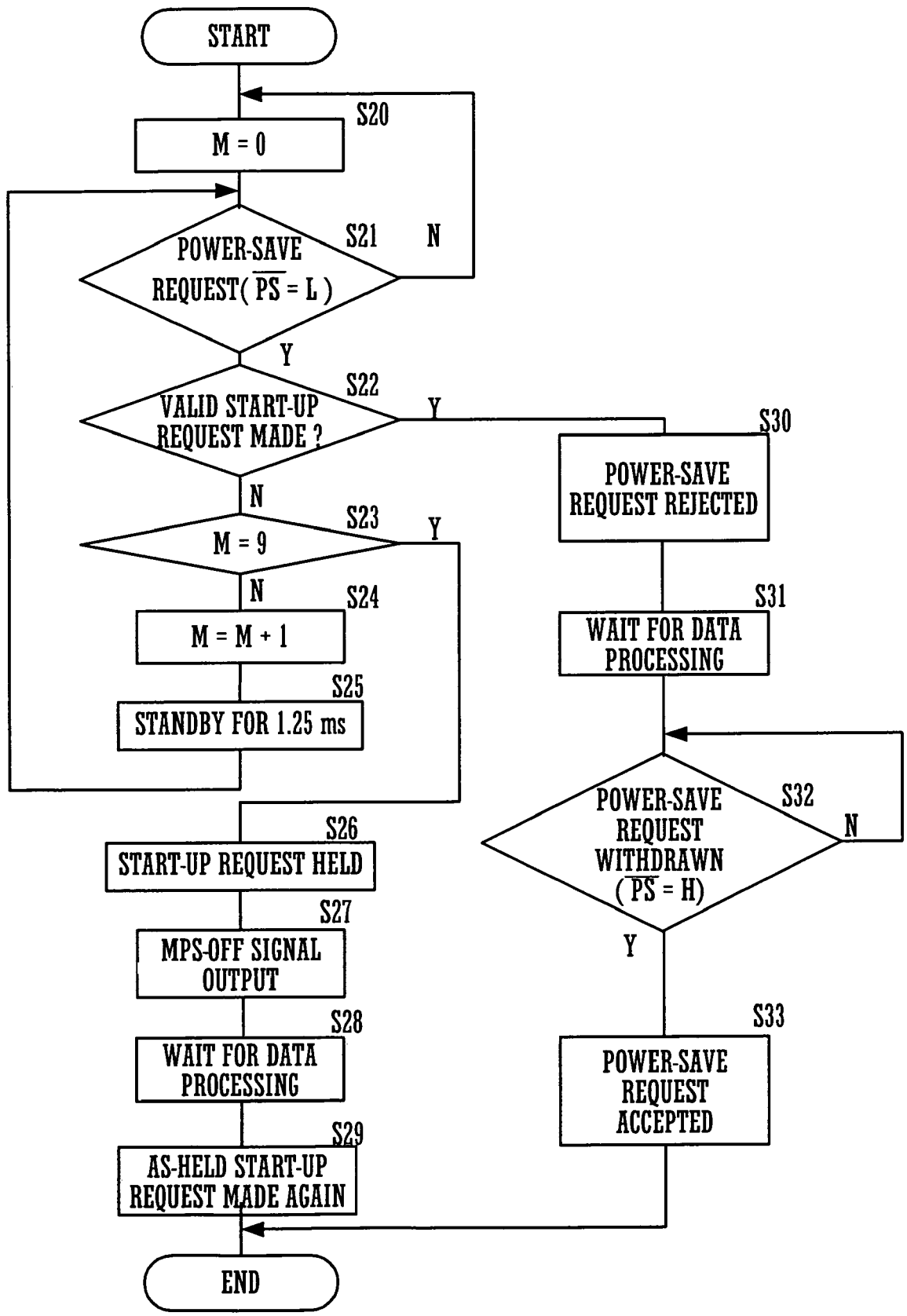
FIG. 13 is a flowchart of a process performed by the main power supply control section and the main control circuit in switching to the power-saving operation mode.

FIG. 13 is a flowchart of a process performed by the main control circuit 10 and the main power supply control section 30 when a power-save request is made in the normal operation mode. The main power supply control section 30 clears a count variable M to zero (step S20) and then stands by until a power-save request is made (step S21). At step S21, the main power supply control section 30 waits for a $\overline{PS4}$ signal that corresponds to the predetermined pattern of power-save request, to be input thereto.

If a valid power-save request $\overline{PS4}$ is made at step S21, the main power supply control section 30 detects whether the power-save request is followed by a valid start-up request (step S22).

When a valid start-up request is not made at step S22, the main power supply control section 30 determines whether the count variable M has reached nine (step S23). If the count variable M has not reached nine, the main power supply control section 30 increments the count variable M (step S24), and stands by for a period of 1.25 ms (step S25), and determines whether the power-save request is continued (step S21). More specifically, in the sequence of steps S23, S24, S25, and S21 and in step S20, the main power supply control section 30 checks for a situation in which a 4-bit $\overline{PS4}$ signal being input does not correspond to the predetermined pattern of power-save request, such as a situation in which a power-save request is withdrawn from the main control circuit 10 before the power-save request is continued for a period of 10 ms.

If the count variable M has reached nine at step S23, the main power supply control section 30 holds a start-up request (step S26). Then the main power supply control section 30 changes a low-level MPS-ON signal to a high-level MPS-OFF signal to turn off the main power supply circuit 60 (step S27). Subsequently, the main power supply control section 30 stands by until the main power supply circuit 60 is turned off completely (step S28). In the present embodiment, it takes approximately 100 ms for the main power supply circuit 60 to be turned off completely. If a valid start-up request is made after the start-up request is held at step S26, the main power supply control section 30 makes the as-held start-up request again (step S29), and then ends the operation.

Once a valid start-up request is made at step S22, where detection is made as to whether a power-save request is followed by a valid start-up request, the main power supply control section 30 rejects any power-save request to prevent unnecessary switching to the power-save operation mode (step S30). Then the main control circuit 10 immediately performs an operation according to the start-up request, and waits for completion of data processing in accordance with the start-up request (step S31). Then the main power supply control section 30 stands by until the power-save request is withdrawn by the main control circuit 10 that has made the power-save request (step S32).

Confirming that the power-save request has been withdrawn by the main control circuit 10, the main power supply control section 30 cancels the rejection of power-save request of step S30, thereby being ready to accept a power-save request (step S33).

Figure 14:
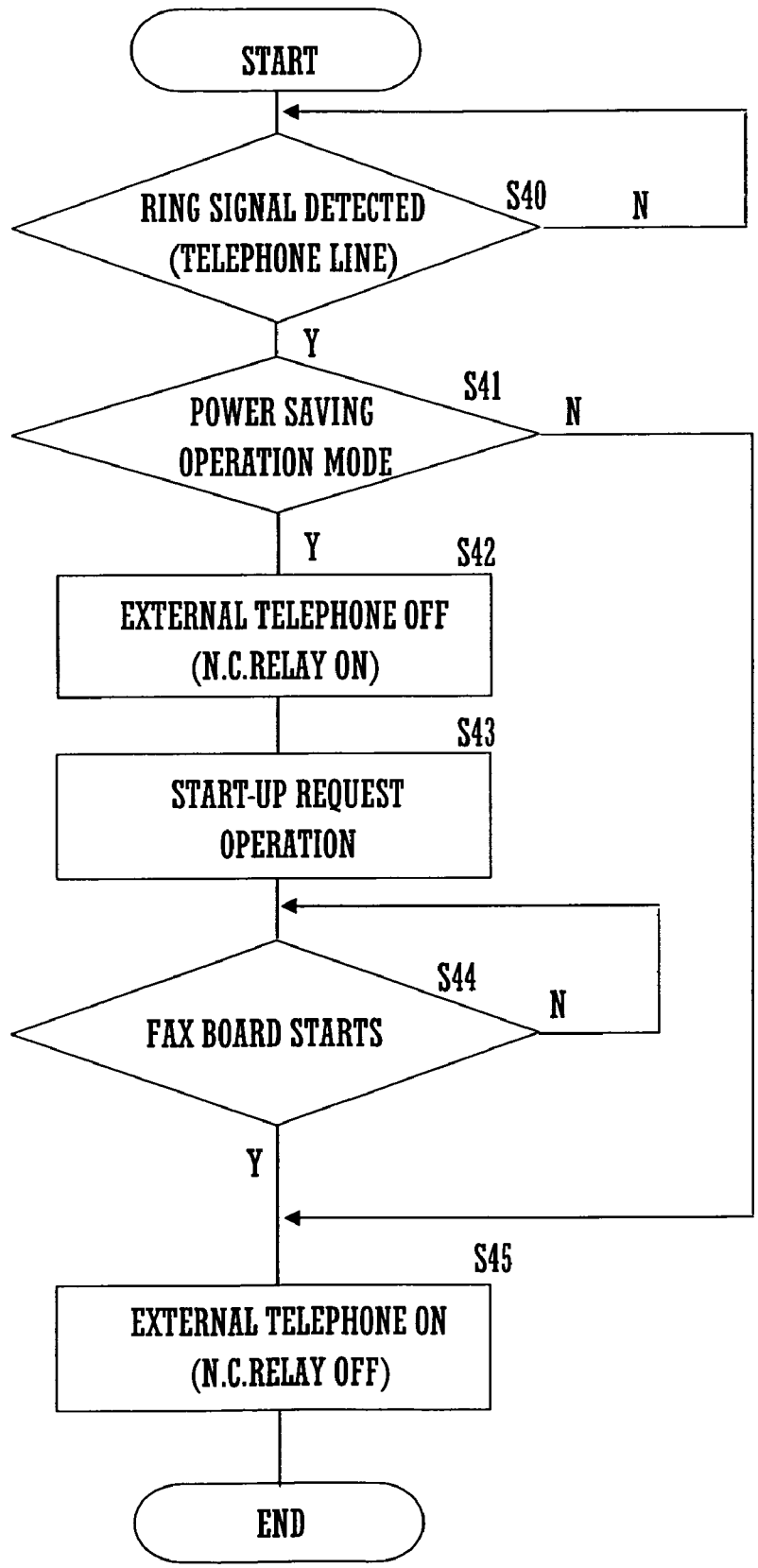
FIG. 14 is a flowchart of ring control process performed by a power supply device.
Figure 15:
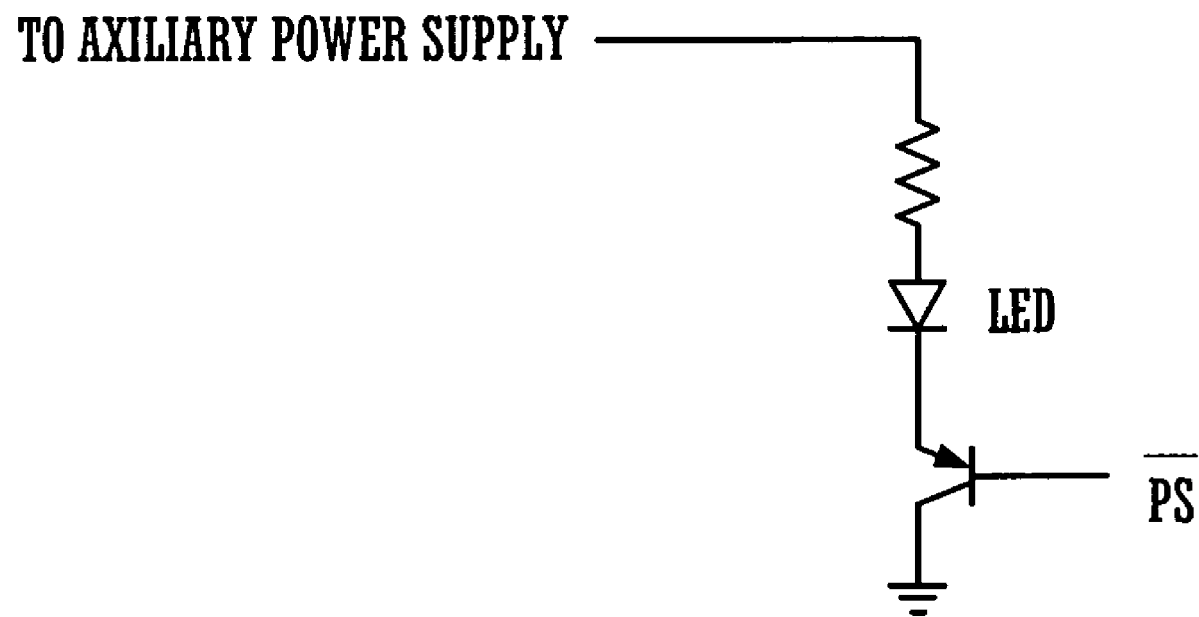
FIG. 15 is a diagram illustrating a structure adapted to notify current operation mode.

FIG. 14 is a flowchart of ring control process performed by a power supply device. In power saving mode, inputting ring signal corresponding to communication request causes the external telephone 80 to ring, but does not cause the FAX board 21 ring since the main power supply circuit is stopped. Operator would feel odd if the external telephone is ringing while the FAX board is silent. To solve such problem, as illustrated in FIG. 10, the external telephone 80 is connected the public line through the N.C. relay 81 that is switched on/off by the ring detection circuit 31. The N.C. relay 81 is switched off when the ring detection circuit 31 does not detect ring signal. The external telephone 80 is connected to the public line only when the N.C. relay 81 is on. If the ring detection circuit 31 detects ring signal input from the public line in the power saving, the ring detection circuit 31 render the N.C. relay 81 open so as to prevent the external telephone 80 from ringing. The main power supply control section 30 generates the start-up request upon the detection of ring signal so as to turn on the main power supply circuit 60 (step S42). Thus the main power supply circuit 60 starts supplying power to the FAX board 21, and then the FAX board 21 becomes ready to ring (step S43). The ring detection circuit 31 stand by until the FAX board 21 is ready (step S44). The ring detection circuit 31 render N.C. relay 81 close state after the FAX board 21 is ready (step S45). Thus both FAX board's ringing and the external telephone's ring attract operator's attention. In addition, it becomes difficult for operator to judge whether the MPF is in power saving mode or not since the display section is not activated by the main power supply circuit 60 in the power saving mode. To solve such problem, structure illustrated in FIG. 15 may be applied to the MFP. The structure includes a light emitting diode connected to the auxiliary power supply circuit, the light emitting diode being activated when valid power saving request (low level signal) is input at its gate.

What is claimed is:

1. A power supply device, comprising:
   a main power supply circuit for supplying power to a main control section of a main apparatus, the main apparatus including a plurality of interface sections for communicating with an external device, each of the interface sections having a signal detection circuit for detecting an external signal;
   an auxiliary power supply circuit for supplying power to only the signal detection circuit, the auxiliary power supply circuit being connected to a commercial power supply; and
   a power control section configured to control the main power supply circuit and the auxiliary power supply circuit respectively, the power control section being configured to turn the main power supply circuit off and turn the auxiliary power supply circuit on when the main apparatus is in power saving mode, and to restart the main power supply circuit upon the detection of external signal by the signal detection circuit,
   wherein the power control section is configured to determine that external signal input to the signal detection circuit is valid only when the signal matches a predetermined pattern.

2. The power supply device according to claim 1,
   wherein the signal detection circuit is devoid of any clock generation circuit and the signal detection circuit is electrically disconnected to the other components including an interface board of the interface section, the interface board is adapted to communicate with an external device, and
   wherein both of the signal detection circuit and the interface board are adapted to receive the same external signal at the same time.

3. The power supply device according to claim 1,
   wherein the interface section includes a interface having a power supply line, and
   wherein the signal detection circuit is supplied with power through the power supply line.

4. The power supply device according to claim 3,
   wherein the auxiliary power supply circuit is charged intermittently by the main power supply circuit or an interface having a power supply line.

5. The power supply device according to claim 3,
   wherein the auxiliary power supply circuit is charged by the main power supply circuit or an interface having a power supply line when the auxiliary power supply circuit outputs voltage lower than a predetermined value.

6. The power supply device according to claim 1,
   wherein the power control section is configured to determine that external signal input to the signal detection circuit is valid only when the signal continues for a predetermined period.

7. The power supply device according to claim 1,
   wherein the power control section is configured to determine that power saving request for switching the power supply device to the power saving mode is valid only when the power saving request matches a predetermined pattern.

8. The power supply device according to claim 1,
   wherein the power control section is configured to determine that power saving request for switching the power supply device to the power saving mode is valid only when the power saving request continues for a predetermined period.

9. The power supply device according to claim 1, wherein the power control section is configured to render the main power supply circuit off, even if an external signal input to the signal detection circuit is detected, until the main power supply circuit stops completely after receiving power saving request which indicates that the main apparatus is shifting to the power saving operation mode.

10. The power supply device according to claim 9, wherein the power control section is configured to determine that the power saving request is valid only when the power saving request continues for a predetermined period.

11. The power supply device according to claim 10, wherein the power control section is configured to determine that external signal input to the signal detection circuit is valid when the signal is input thereto within a predetermined period after the input of the power saving request and to render the main power supply circuit on-state.

12. The power supply device according to claim 11, wherein the power control section is configured to reject subsequent power saving requests until ongoing power saving request is withdrawn.

13. A communication system, comprising:
   a power supply device as recited in claim 2; and
   an external device connected to the main apparatus through the interface section,
   wherein the external device transmits a piece of data repeatedly to the main apparatus.

14. The communication system according to claim 13,
   wherein the external device recognizes lack of response as a communication error only after a predetermined number of times of sending the same piece of data.

15. A power supply device, comprising:

a main power supply circuit for supplying power to a main control section of a main apparatus, the main apparatus including a plurality of interface sections for communicating with an external device, each of the interface sections having a signal detection circuit for detecting an external signal;

an auxiliary power supply circuit for supplying power to only the signal detection circuit, the auxiliary power supply circuit being connected to a commercial power supply; and a power control section configured to control the main power supply circuit and the auxiliary power supply circuit respectively, the power control section being configured to turn the main power supply circuit off and turn the auxiliary power supply circuit on when the main apparatus is in power saving mode, and to restart the main power supply circuit upon the detection of external signal by the signal detection circuit, wherein the power control section is configured to determine that external signal input to the signal detection circuits is valid only when the signal matches a predetermined pattern, and wherein the power control section includes a photocoupler adapted to be responsive to external signal input to the signal detection circuit for turning on the main power supply circuit in the power saving operation mode.

* * * * *